Jan. 30, 1934.                M. D. WALLACE                 1,945,455
                AUTOMATIC LENGTH CONTROLLED SORTING MACHINE
                  Filed Jan. 28, 1932        10 Sheets-Sheet 1
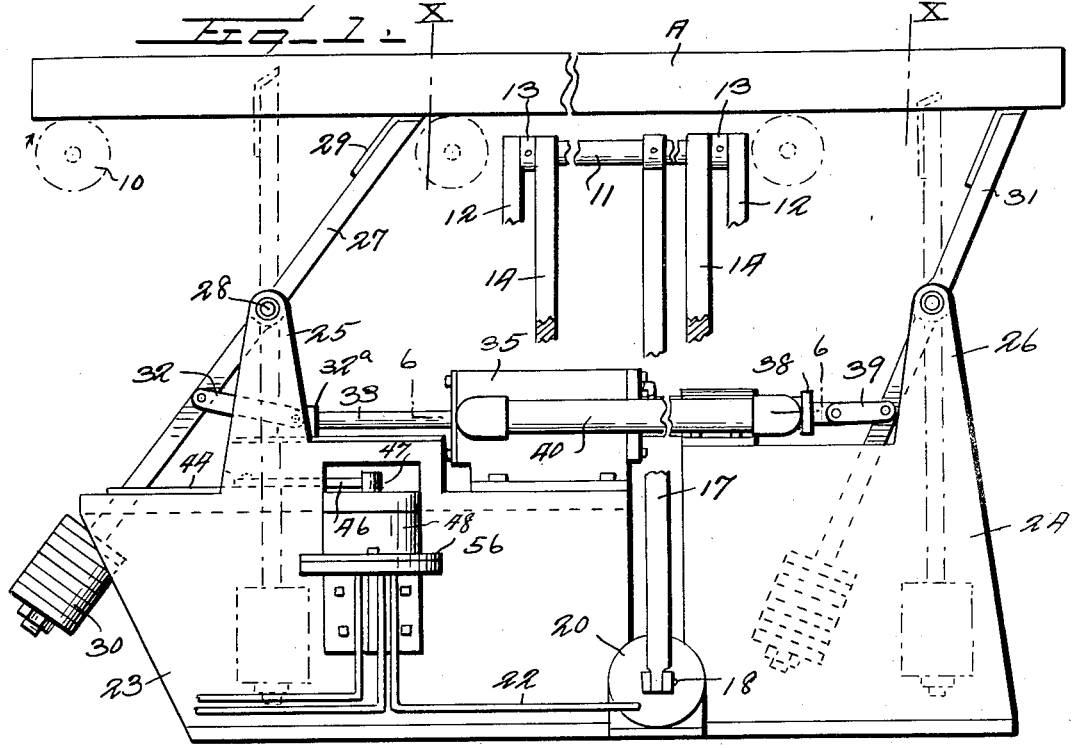
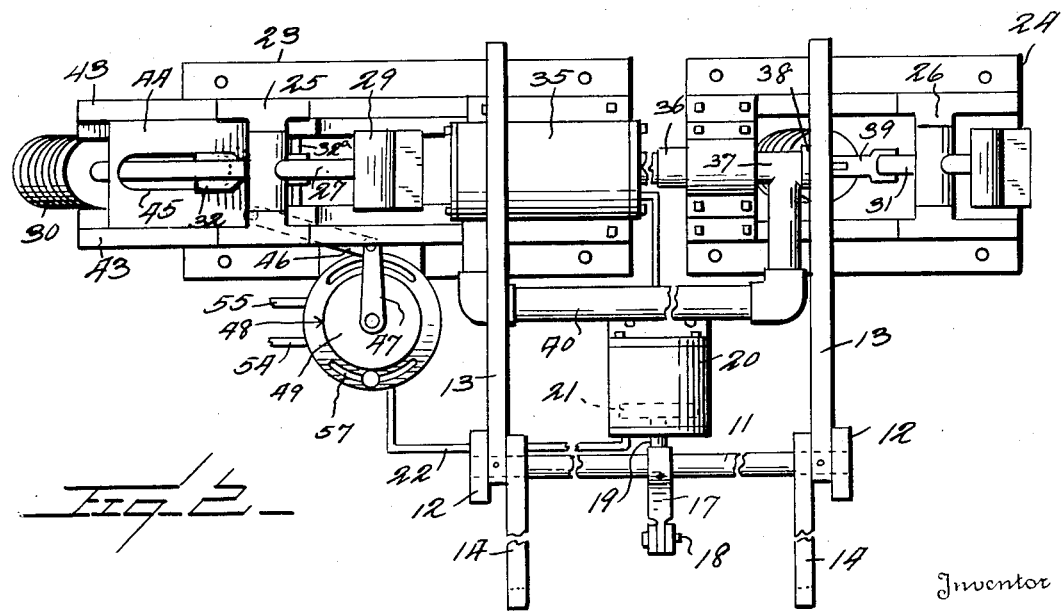
Inventor
M. D. Wallace
By Watson E. Coleman
        Attorney

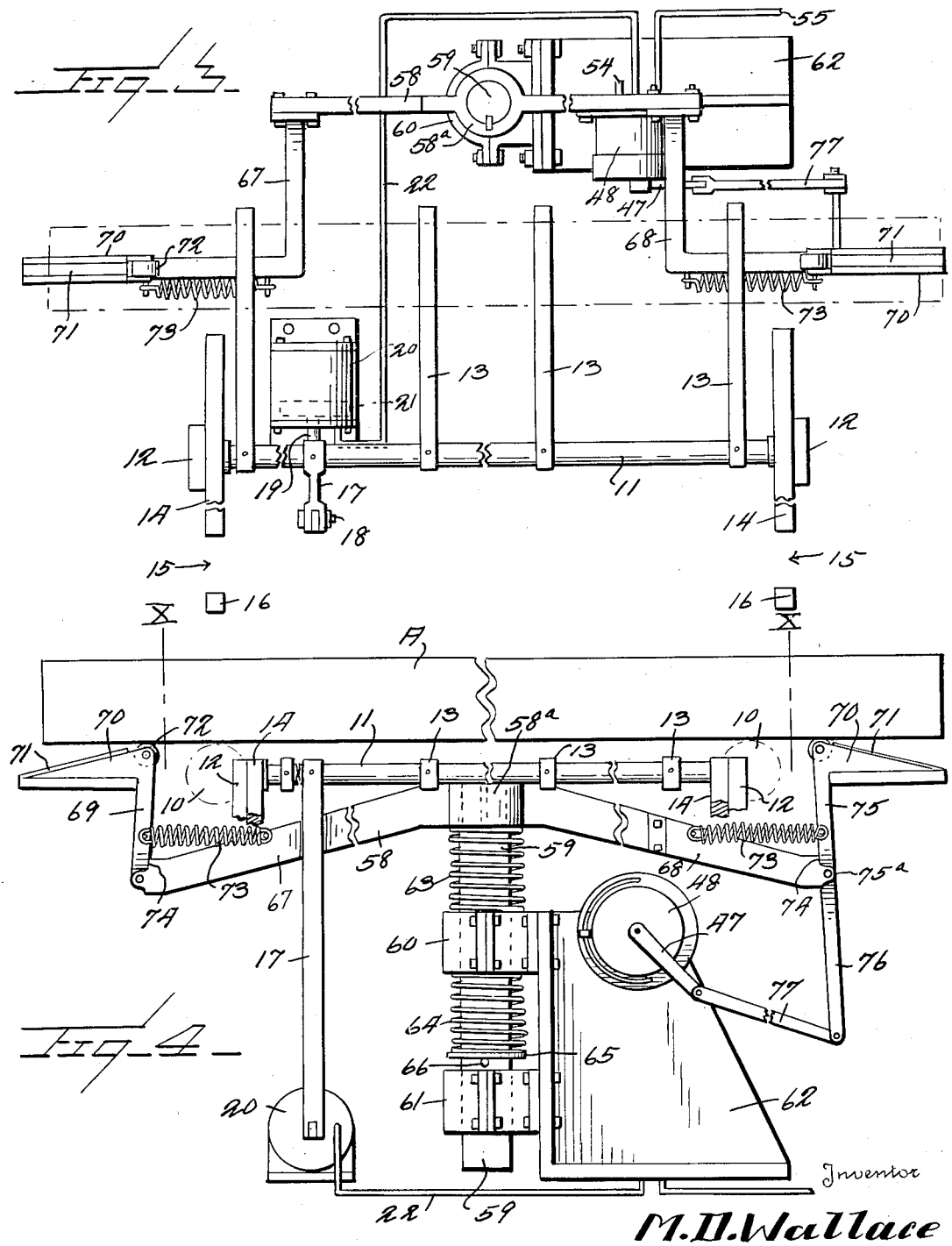

Jan. 30, 1934. M. D. WALLACE 1,945,455
AUTOMATIC LENGTH CONTROLLED SORTING MACHINE
Filed Jan. 28, 1932 10 Sheets-Sheet 3
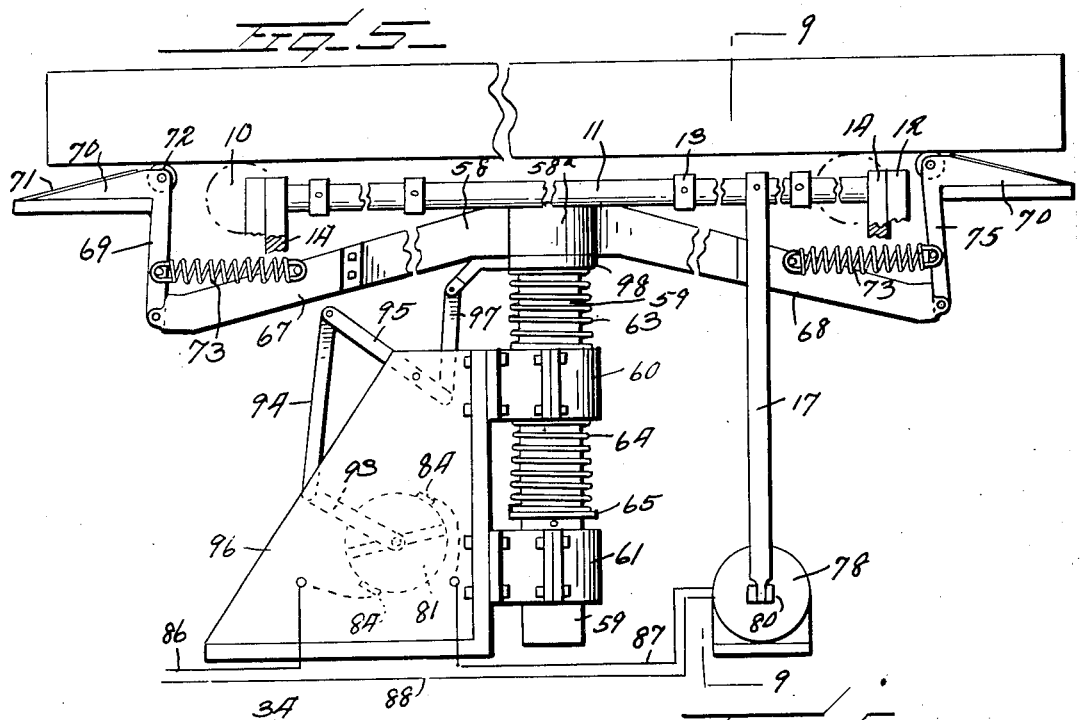
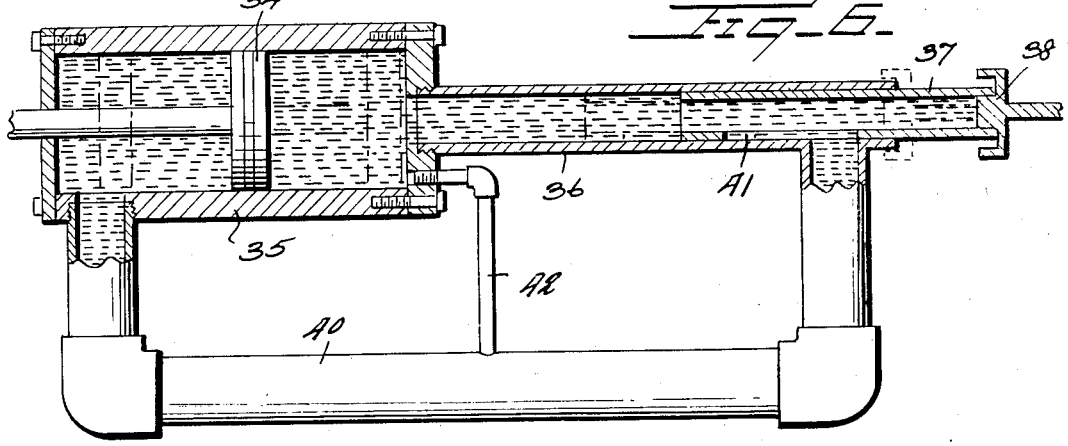
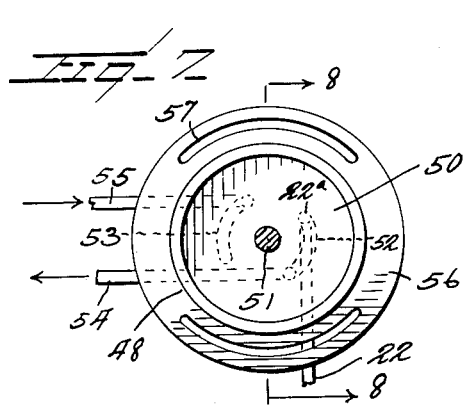
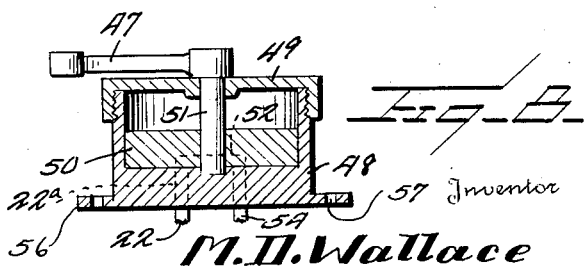
Inventor
M. D. Wallace
By Watson E. Coleman
Attorney

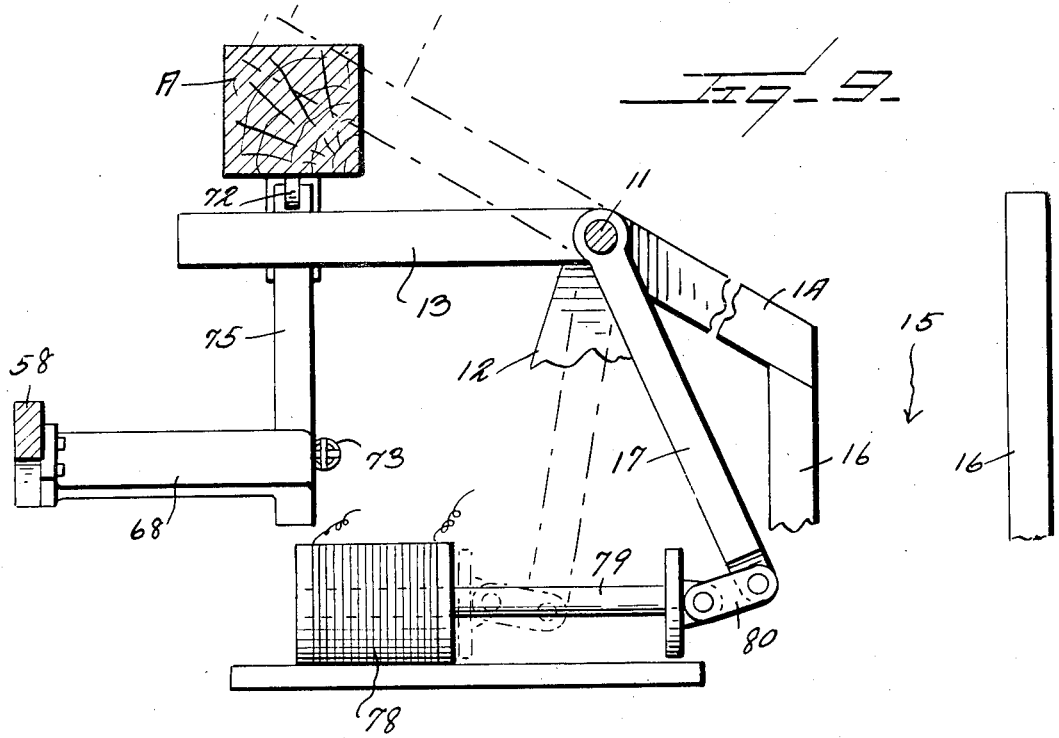
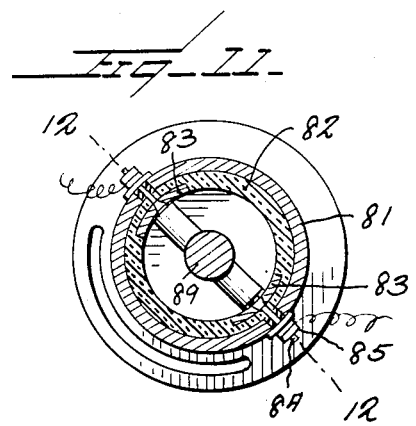
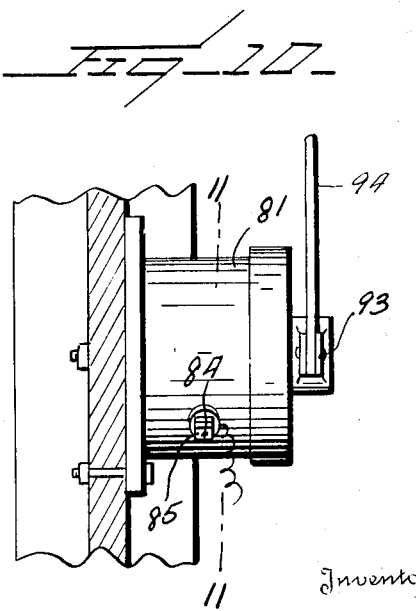
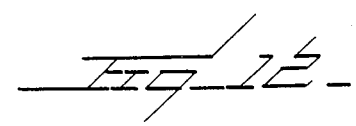
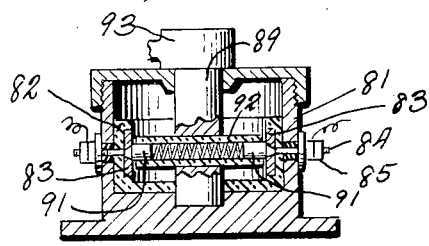

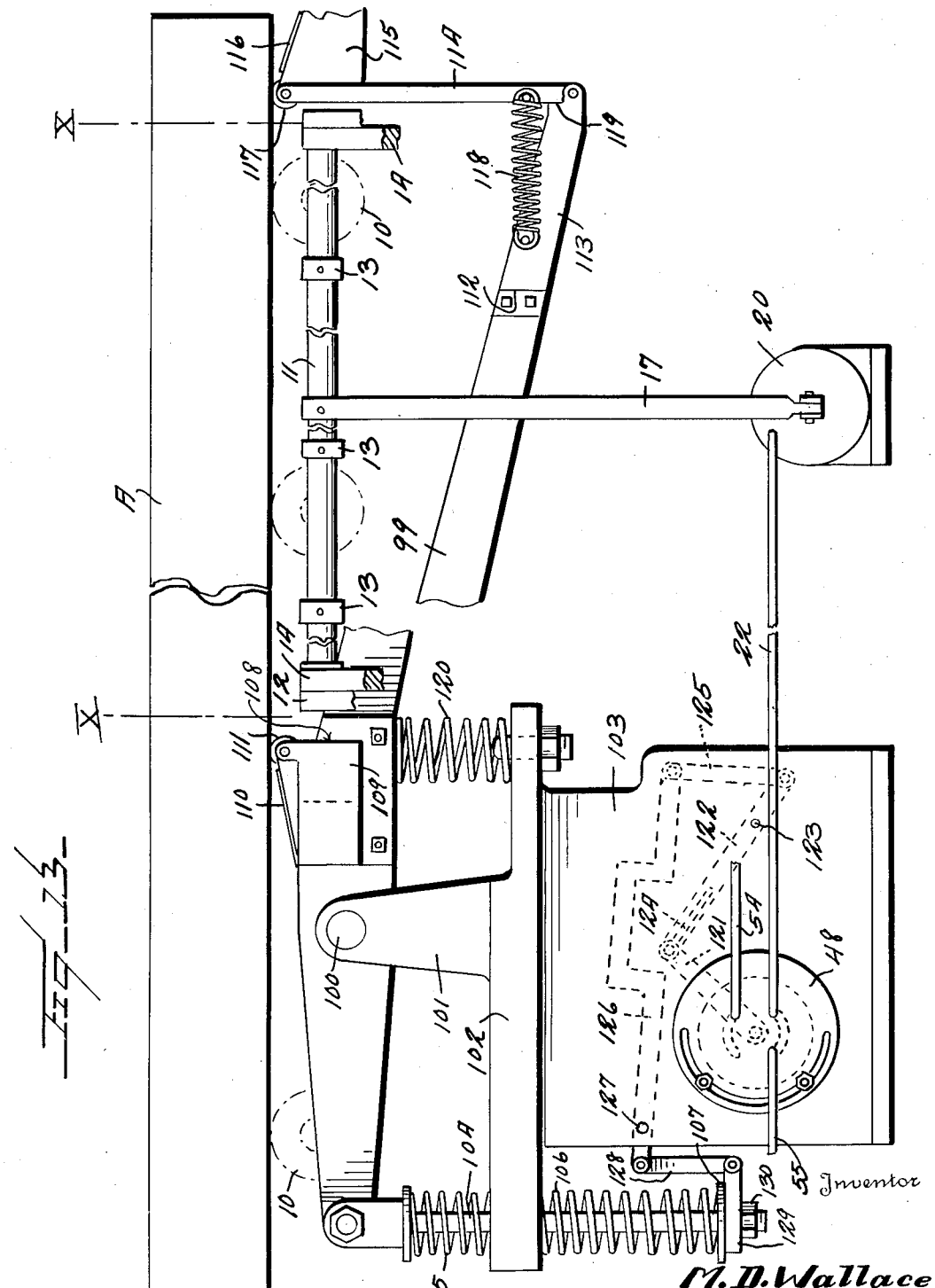

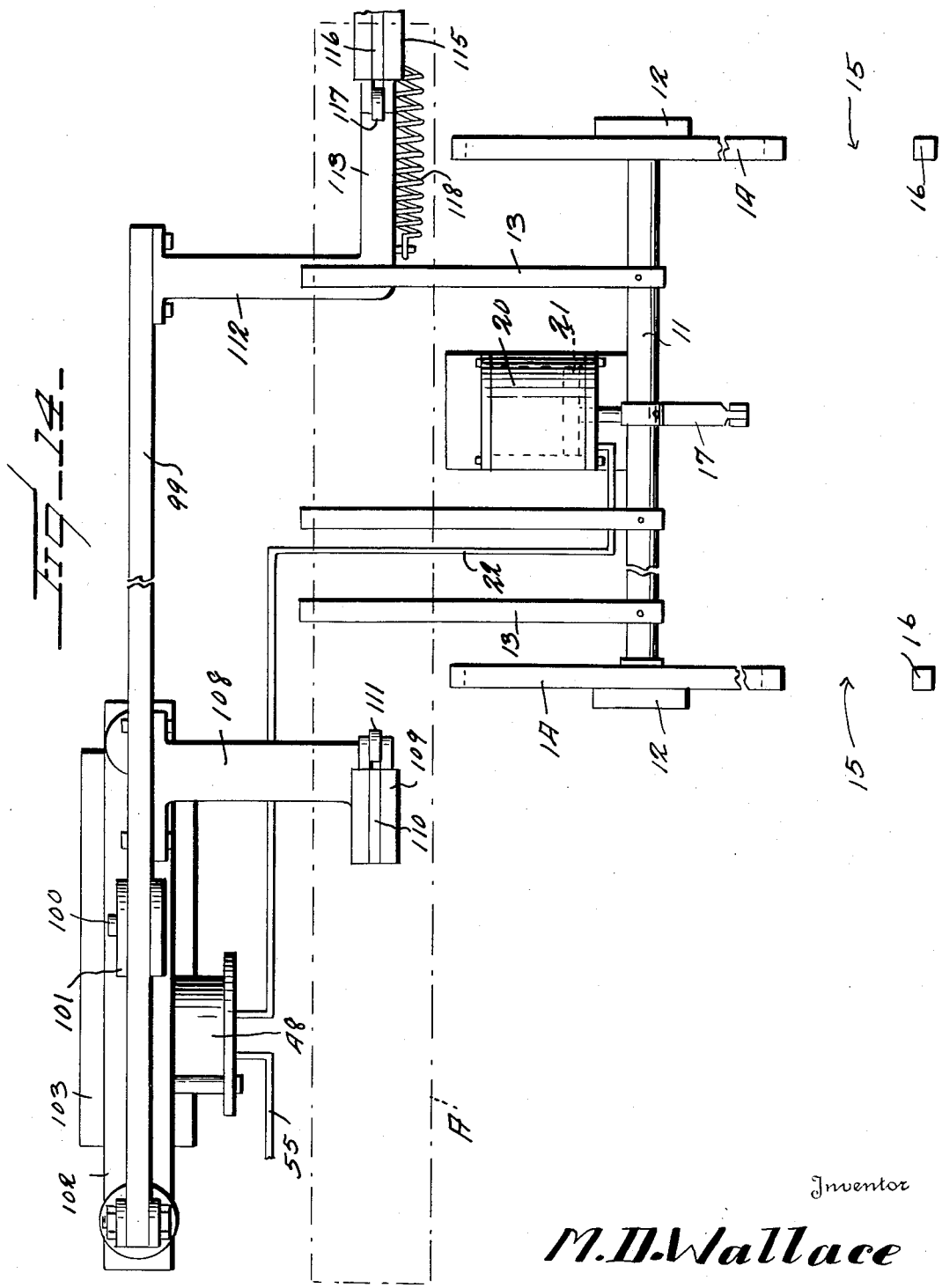

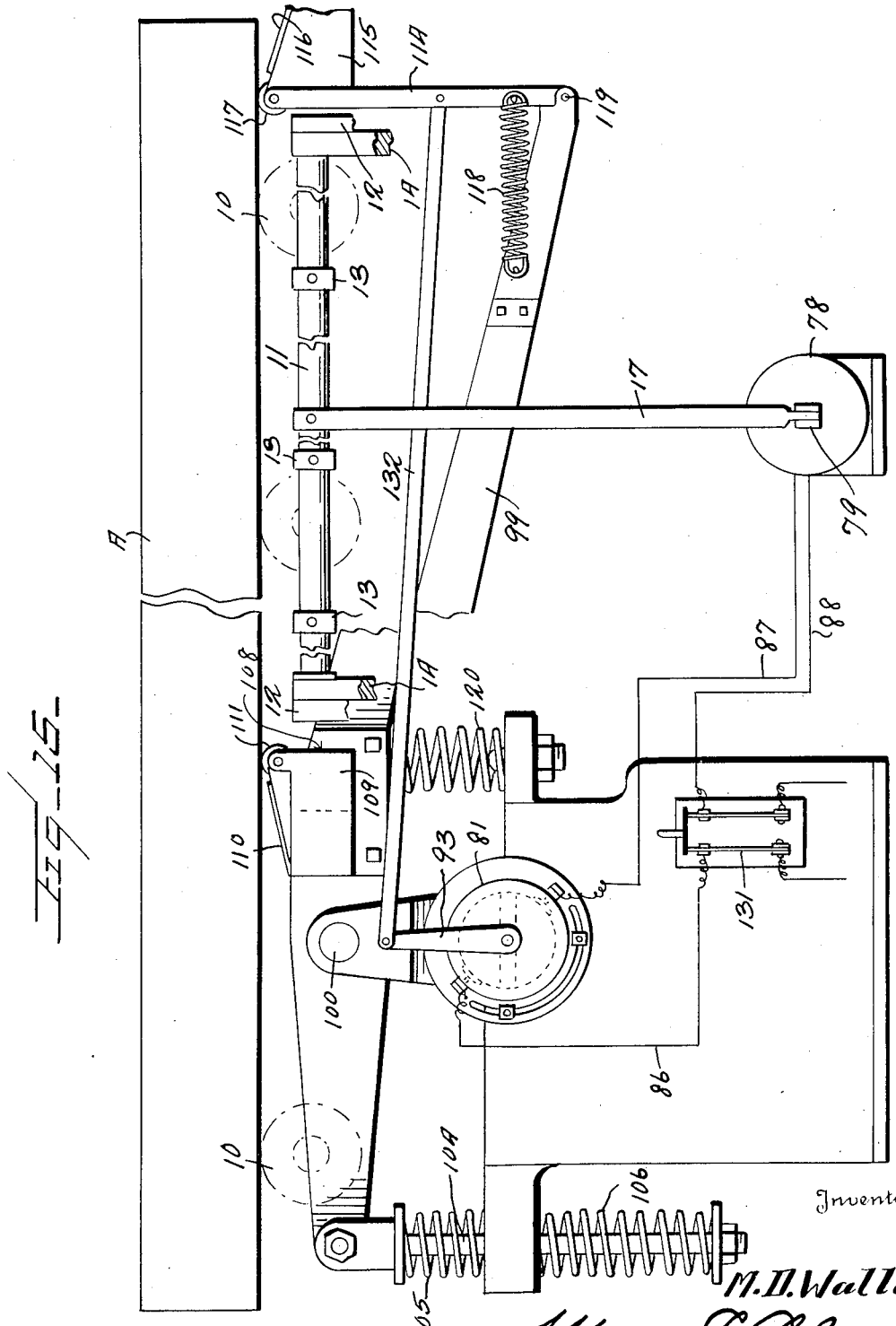

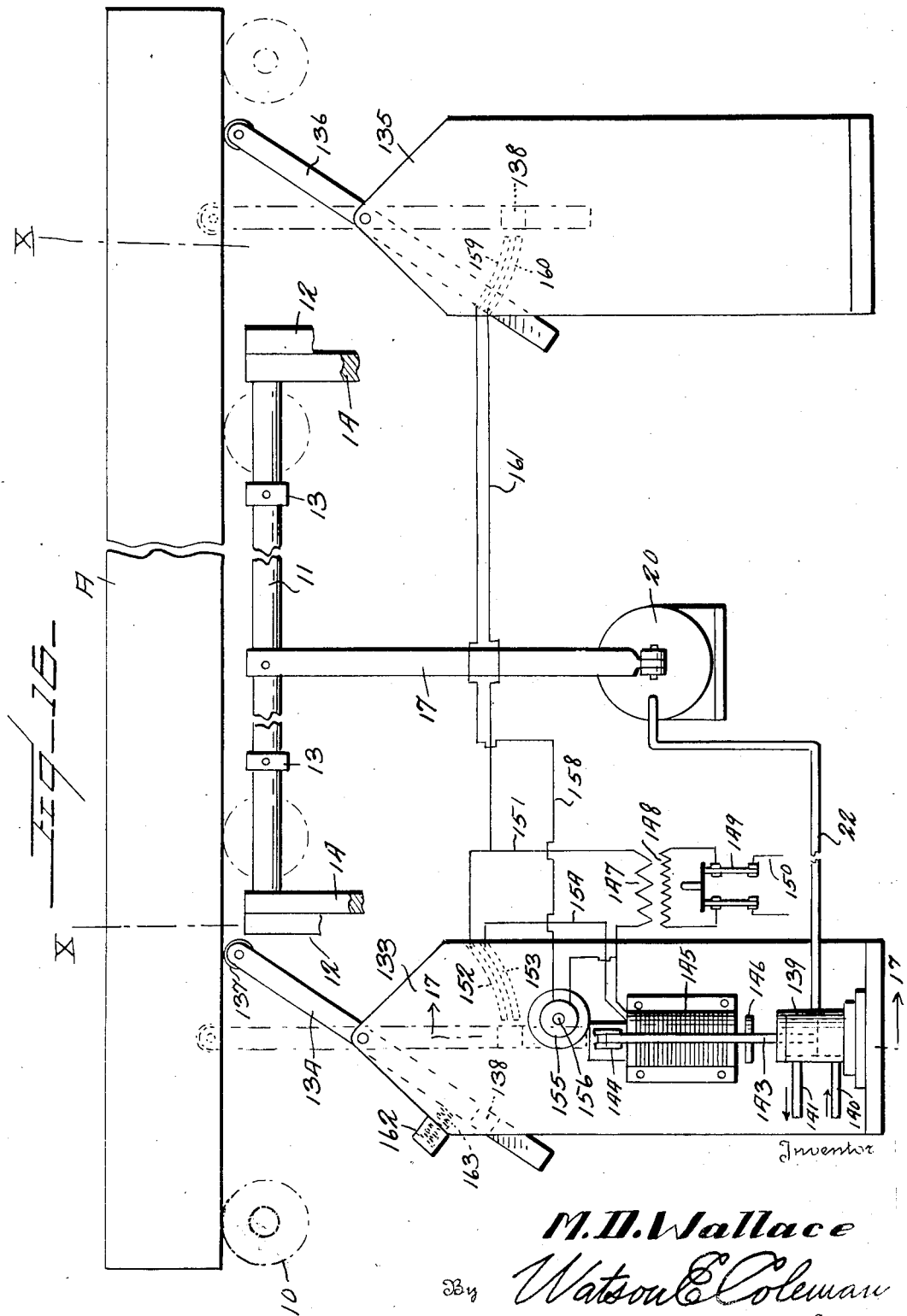

Jan. 30, 1934.  M. D. WALLACE  1,945,455
AUTOMATIC LENGTH CONTROLLED SORTING MACHINE
Filed Jan. 28, 1932   10 Sheets-Sheet 9
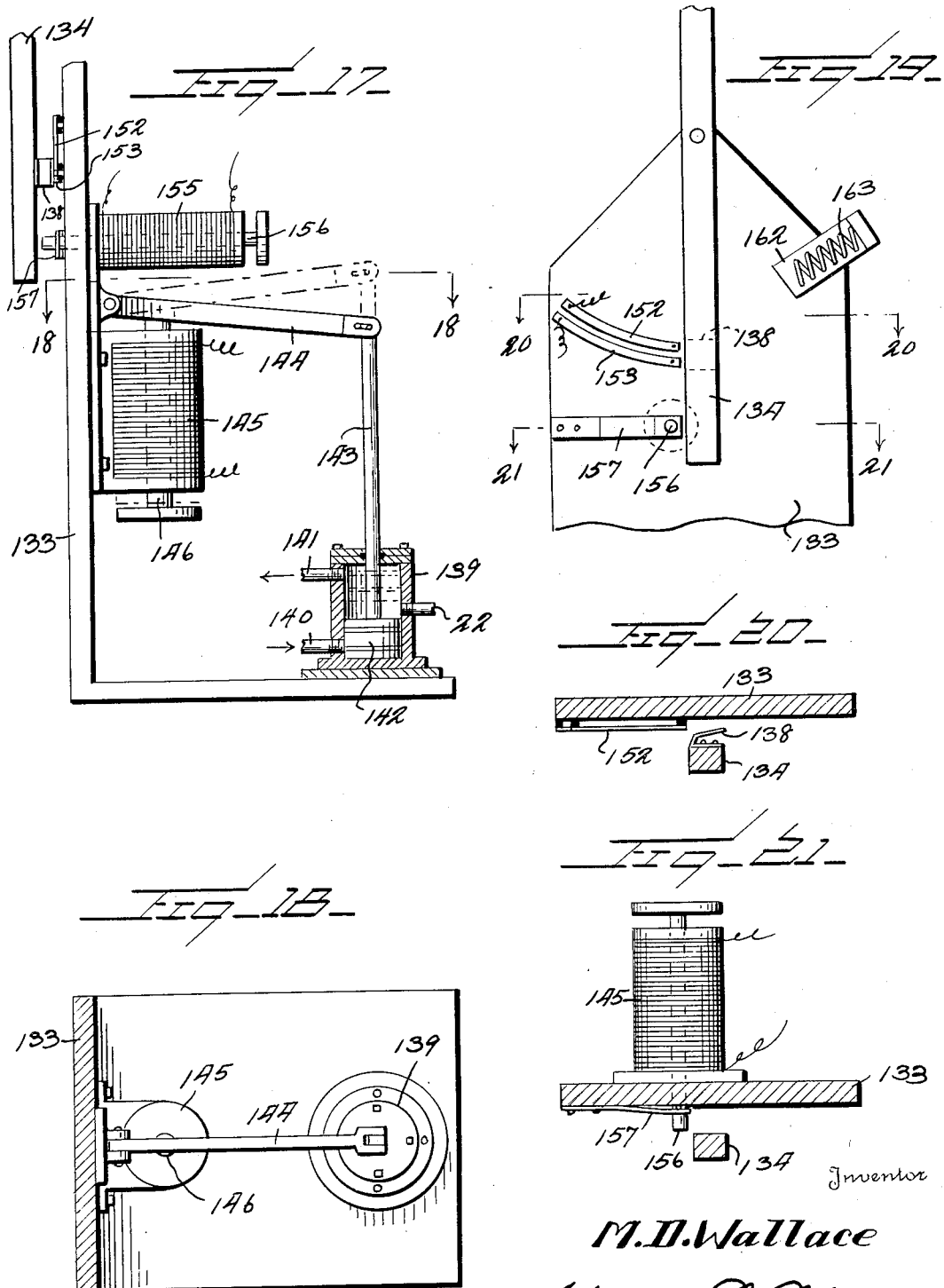
Inventor
M. D. Wallace
By Watson E. Coleman
Attorney

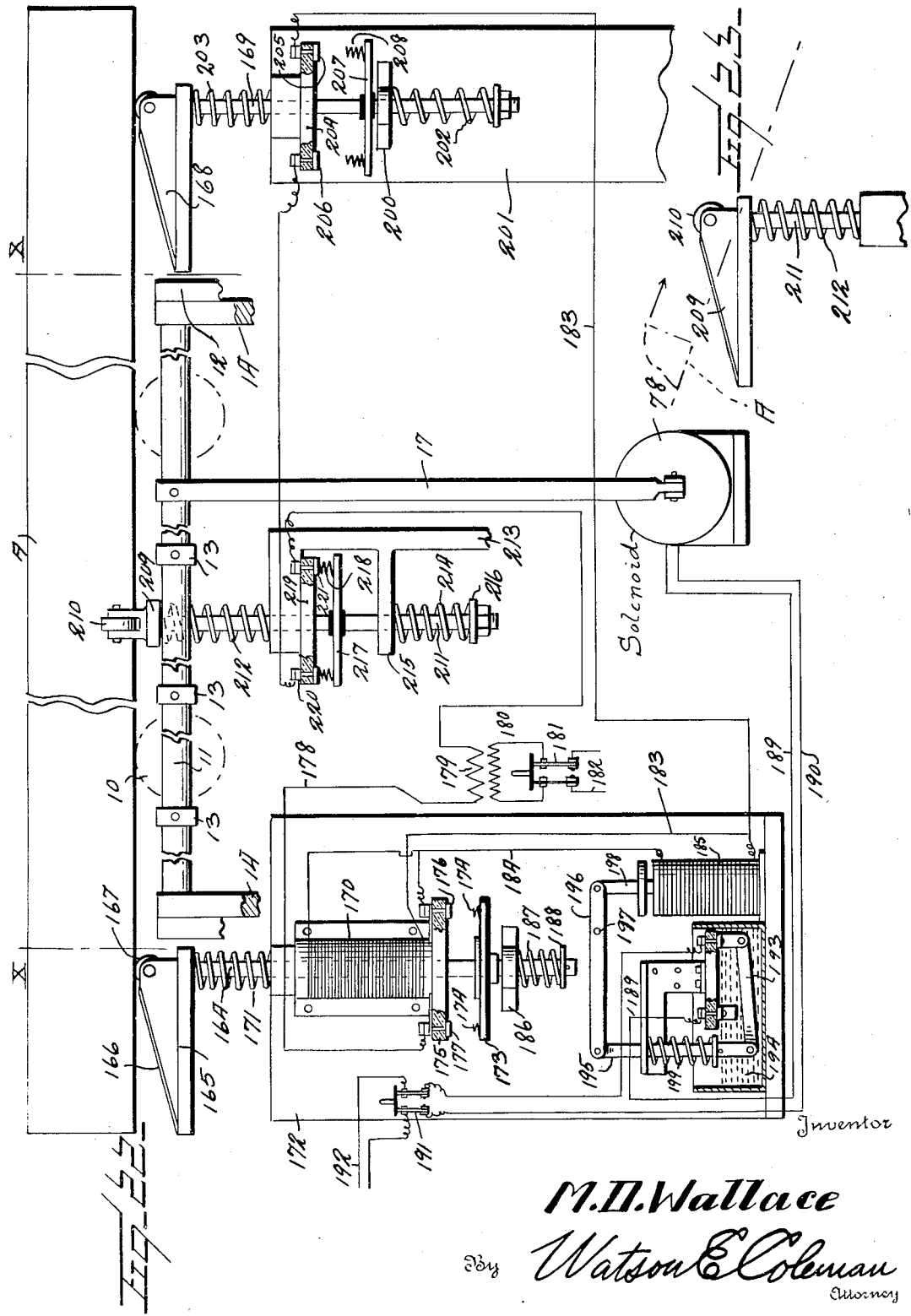

Patented Jan. 30, 1934

1,945,455

UNITED STATES PATENT OFFICE 1,945,455

AUTOMATIC LENGTH CONTROLLED SORTING MACHINE

Michael D. Wallace, McKeesport, Pa.

Application January 28, 1932. Serial No. 589,471

23 Claims. (Cl. 209—90)

This invention relates to sorting machines designed particularly for sorting billets, bars, sheets, beams, tubes or like elongated articles, the articles being sorted with relation to their length.

The general object of the invention is to provide a sorting machine of this character in which the articles are carried by any suitable means along a predetermined path, the articles passing over a plurality of lifting mechanisms which are automatically actuated, if the article is of such a predetermined length, to lift the article from the track over which it is passing and discharge the article into a bin, articles of greater length passing over this particular lifting mechanism and being engaged and lifted off the track later on.

A further object is to provide a construction of this character which is actuated automatically by the length of the articles being sorted and which embodies in all forms of my invention two contact members normally disposed in the path of movement of the article and an article lifting and discharging mechanism actuated by the elevation of both of these contact members, assuming that the article is of a predetermined length too short to depress both of these members or by the engagement of the forward end of the article with one of the contact members and the simultaneous disengagement of the rear end of the article from the other contact member, this action acting to automatically operate the lifting mechanism which lifts the article from the track and discharges it laterally into a bin.

A further object of the invention is to provide mechanism of this character which is either operated by hydraulic, pneumatic or electrical means or a combination of these means as will appear more fully hereinafter.

My invention is illustrated in the accompanying drawings, wherein:—

Figure 1 is a side elevation of one embodiment of my invention;

Figure 2 is a plan view thereof;

Figure 3 is a fragmentary top plan view of another embodiment of my invention;

Figure 4 is a side elevation thereof;

Figure 5 is a side elevation of still another form of my invention;

Figure 6 is a longitudinal sectional view on the line 6—6 of Figure 1;

Figure 7 is a top plan view of the controlling valve shown in Figure 1 with the top removed;

Figure 8 is a section on the line 8—8 of Figure 7;

Figure 9 is a sectional view on the line 9—9 of Figure 5;

Figure 10 is a side elevation of the switch shown in dotted lines in Figure 5;

Figure 11 is a section on the line 11—11 of Figure 10;

Figure 12 is a section on the line 12—12 of Figure 11;

Figure 13 is a side elevation partly broken away of another embodiment of my invention;

Figure 14 is a top plan view thereof;

Figure 15 is a side elevation of the modification of the structure shown in Figure 13;

Figure 16 is a side elevation of another embodiment of my invention;

Figure 17 is a fragmentary end elevation of the structure shown in Figure 16, the controlling valve being in section;

Figure 18 is a section on the line 18—18 of Figure 17;

Figure 19 is a fragmentary rear elevation of the finger supporting frame at the entrance end of the mechanism shown in Figure 16;

Figure 20 is a section on the line 20—20 of Figure 19;

Figure 21 is a section on the line 21—21 of Figure 19;

Figure 22 is a side elevation of another electrically controlled form of my invention, parts being broken away;

Figure 23 is an elevation of the switch actuating finger shown in Figure 22 for breaking the circuit through the actuating devices as the article shifts downward on to the skidway.

Swinging contact hydraulically operated machine

In Figures 1 and 2, I have shown a hydraulically or pneumatically operated sorting mechanism. The article A to be sorted I have indicated diagrammatically as a bar or beam. A series of rollers 10 are provided which may be of any suitable character, these rollers being disposed a predetermined distance apart and being driven by any suitable means in the direction of the arrow in Figure 1 so as to carry the article along over the several sorting mechanisms. It is to be understood that the conveying means, which I have shown as consisting of driven rollers 10, might be of any suitable character or might be in the form of chains, belts or other horizontal conveyors. Preferably, however, they will have the form of driven rollers 10 as stated.

At intervals along the path of travel of the articles A will be disposed means actuated by the length of the several articles A for lifting a selected article from the rolls, discharging this article down an inclined track and into a bin. It will be understood that the lifting or sorting devices will be all alike but will merely differ as to the length of the article to be sorted and that, therefore, I have illustrated only one of these sorting machines in Figures 1 and 2.

Disposed on a level below the path of movement of the articles A is a shaft 11 which is rotatably supported in suitable bearings upon vertical supports 12. This shaft carries upon it the two lifting arms 13 which extend beneath the path of movement of the article A as shown in Figure 2. These arms, as the article approaches the sorting station, will be disposed in a horizontal plane or in a downwardly inclined plane below the path of movement of the articles but as the article moves in a position over these arms, if the article is sufficiently short in length, these arms will be lifted to lift the article off the rollers 10 and allow the article to slide, roll or otherwise move down the arms 13 and be discharged on to inclined ways 14 which in turn discharge the articles downward into a piling space designated 15 and defined by posts 16, one of which is shown in Figure 2. This is clearly shown in Figure 9 which is a section through a different form of mechanism but which shows the lifting arms 13, the inclined ways 14 and the posts 16.

In order to rotate the shaft 11 and lift the arms 13, I connect to the shaft 11 the outwardly and downwardly extending arm 17. This arm 17 is rigidly attached to the shaft 11 and at its lower end is pivotally connected at 18 to a piston rod 19 having a bifurcated end through which the bolt or other pivotal connection 18 passes.

This piston rod 18 extends through the head of a cylinder 20 and carries upon its inner end the piston 21. When fluid is admitted to the cylinder 20 through pipe 22, the piston 21 will be forced inward, thus rotating the shaft 11 in a direction to lift the arms 13 which will lift the article A off the rollers 10 and cause the article to slide downward as shown most clearly in Figure 12 on to the skids or ways 14 and thus drop into the space 15. The admission of fluid to this cylinder 20 only occurs when an article comes along which is of a selected length and of a length as will automatically operate the controlling mechanism.

Disposed below the path of movement of the article A are two supporting frames designated generally 23 and 24. The frame 23 has upwardly projecting brackets 25 and the frame 24 the upwardly projecting brackets 26. Between the brackets 25 is disposed a swinging contact member 27 pivoted at 28. The upper end of this contact member is beveled and carries a wear plate 29 and the lower end of the contact member 27 is counter-weighted at 30, the counter-weights being removable or replaceable so that any desired weight may be added to or subtracted from the lower end of the arm 27.

Between the brackets 26, a contact member 31 is pivoted having the same construction as the contact member 27. Normally and when no article is passing over these contact members, the contact members are swung by their counter-weights into a vertical position as shown in dotted lines in Figure 1. When an article A comes along, however, the forward end of this article first strikes the contact member 27, depressing it to the full line position in Figure 1 and as the article moves further along and if it is of a sufficient length, it will strike the upper end of the element 31 and depress it to the full line position.

If the contact member 31 is depressed or swung to its full line position in Figure 1 before the rear end of the article A has passed the contact member 27, then the lifting mechanism is rendered inoperative but if the article A is so short that the rear end of the article A has left the contact member 27, before the forward end of the article has reached and depressed the contact member 31, then the lifting arms 13 will be raised automatically to lift the article off. In other words, this sorting mechanism shown in Figures 1 and 2 is intended to remove articles having a length less than the length X—X in Figure 1 but will not be affected by articles having a greater length than the length X—X.

As illustrated in Figures 1 and 6, the swinging contact member 27 is connected by a link 32 to a cross head 32a of a piston rod 33, carrying the piston 34 operating within the cylinder 35 shown in Figure 6. Extending from this cylinder is a tubular neck or extension 36 within the outer end of which is disposed a tubular hollow piston 37 closed at its end by a head 38 to which the contact member 31 is linked by a link 39. A by-pass pipe 40 is connected and opens into the forward end of the cylinder 35 and into the rear end of the extension 36. The piston 37 is provided in its length with a port 41 which, when the piston is forced outward a predetermined distance, establishes communication between the interior of the extension 36 and the adjacent end of the pipe 40. A small pipe 42 connects the by-pass 40 with the rear end of the cylinder 34 shown in Figure 6. Mounted in guideways 43 on the supporting frame 23 is a slide 44 which is longitudinally slotted at 45 and the finger or contact member 27 passes downward through this slot.

When the contact member 27 is thrown over to the full lined position in Figure 1, the finger will contact with the rear end of the slot and pull this slide rearward. If on the other hand this member 27 is swung past its dotted line position in Figure 1, the member 27 will contact with the forward wall of the slot, pushing the slide 44 forward. This slide 44 is connected by a link 46 to an arm 47 of a controlling valve. The controlling valve consists of a casing 48 having a cover 49 and disposed within this casing is an oscillatable valve 50 which is attached to a shaft 51 upon which the arm 47 is mounted. This controlling valve, as shown in Figure 7 has the two arcuate ports 52 and 53 coacting with two ports formed in the bottom of the casing and connected to pipes 54 and 55. One of these pipes 55 leads to a source of fluid under pressure. The other pipe 54 is an exhaust pipe. The pipe 22 terminates in a port 22a (see Figure 7) so that this port 22a which constitutes a discharge opening of the pipe 22 leading from the cylinder 20 can be connected by this valve 50 either to the inlet pipe 55 or to the outlet pipe 54.

Preferably the flange 56 of the casing 48 is formed with two slots 57 through which fastening bolts or screws may pass to hold the valve in place upon a base so that this valve may be properly adjusted relative to the rest of the mechanism. These slots 57, however, have no bearing on the actual operation of the valve.

Assuming now that the contact fingers 27 and 31 are in their dotted lined positions and that an article A moves from the left hand side of Figure 1 toward these contact fingers, then as the forward end of the article A strikes the first contact finger 27, it swings it over to the full lined position in Figure 1.

This acts to shift the piston 34 from its full lined position in Figure 6 to its dotted lined position. This is readily permitted because of the fact that the fluid or liquid behind the piston can pass through the large by-pass pipe 40 and up through the valve opening 41 into the extension 36 and back to the space in front of the piston. In other words, this fluid offers no particular resistance to the movement of the finger 27. The movement of the finger 27 from its dotted to its full line position also acts to retract the slide 44, drawing on the link 46 and shifting the arm 47 in a counter-clockwise position to the position shown in Figure 2. This shifts the valve to a position where the pipe 22 is connected with pipe 54, thus permitting the lifting arms 13 to drop down below the path of movement of the article A by their own gravity.

Assuming that the article A is longer than the distance X—X, then the forward end of the article will strike the contact finger 31, swinging it from the dotted line position to the full line position while the finger 27 is still held in its full line position in Figure 1. This acts to shift the valve 37 in Figure 6 inward to the dotted line position, closing the port 41. As soon as the rear end of the article has passed off of the finger 27, this finger will swing back, pushing the piston 34 toward the right in Figure 6. Inasmuch as the port 41 has been closed, however, this movement of the piston toward the right in Figure 6 will be dampened or very slow by reason of the fact that the liquid in front of the piston can only pass out through the small pipe 42 or, in other words, can only by-pass through this pipe 42 and this will prevent the contact finger 27 from moving beyond the dotted line position in Figure 1 after the article has passed it.

This swinging movement of finger 27 does not affect the slide 44 and thus does not affect the valve 50 and as a consequence, the lifting arms 13 remain in their lowered position. The article moves on and when its rear end has moved past the finger 31, the finger 31 returns to its vertical position as shown in dotted lines, thus again opening the valve 37. The lifting arms thus remain lowered and the two fingers 27 and 31 are in their vertical positions until the next object comes along.

If this article is of a length less than the distance between the lines X—X in Figure 1, then its action is as follows:—

The forward end of the article strikes the finger 27, shifting it to its full line position in Figure 1. This retracts the slide 44, opening communication between the exhaust pipe 54 and the rear end of the cylinder 20 as previously described, but in this instance before the article has engaged the finger 31, the rear end of the article has passed the contact finger 27. The contact finger 27 then swings back toward its vertical position but in this case there is no dampening of this movement because the valve 37 is open so that the lever 27 has practically free movement and swings back under the action of gravity beyond the dotted line position in Figure 1 and the lower end of the finger strikes the forward end of the slot 45, shifting the slide 44 over to the right in Figure 2. This shifts the valve 50 to such a position that the inlet pipe 55 is connected to the cylinder 20 and fluid under pressure passes into the cylinder, forcing inward on the piston 21, shifting the arm 17 in a direction to lift the arms 13 upward and lift the article off the rollers entirely so that the article now rolls or slides down the arms 13 on to the skidways 14 and is discharged into the space 15.

The arms 13 remain raised, however, until the next succeeding article comes along the track, when its forward end once more strikes the finger 27 and as heretofore described shifts the valve 50 to a position where communication is established between the cylinder 20 and the exhaust pipe 54 allowing the arms 13 to drop, whereupon the action is as previously described. This machine is operated by compressed air, compressed gas, steam or water under pressure and as will more fully appear hereinafter, this controlling valve and the coacting fluid operated piston 21 with its cylinder 20 may be interchanged with electrically operated devices, if desired.

*Vertically movable beam, hydraulically operated machine*

In Figures 3 and 4, I show another embodiment of my invention in which the mechanism for operating the lifting arms is only actuated when an article arrives at the sorting station which is so short as to allow both contact fingers to move vertically upward (instead of swinging as in Figures 1 and 2) and in which both contact fingers are depressed by an article of greater length than the length intended to be sorted at this particular station. The mechanism shown in Figures 3 and 4 includes the same elevating arms 13 mounted upon the shaft 11 as previously described, this shaft 11 being mounted upon supports 12 of any suitable character extending to the floor, the arms 13 when raised lifting the article off of the rollers 10 and discharging it upon the skidways 14, the article then rolling down these inclined skidways to the space 15 into which the article of the proper length is discharged.

Associated with the shaft 12 is the arm 17 as previously described which at its lower end is connected to the piston 21 operating within the cylinder 20, this cylinder having a pipe 22 which constitutes either the inlet or outlet from the cylinder. So far these parts are precisely the same as previously described and illustrated in Figures 1 and 2. Therefore, the same numerals have been used for these parts. In Figures 1 and 2, the operating mechanism is disposed immediately below the lifting arms 13 whereas in Figures 3 and 4, the operating mechanism is disposed to one side of the path of movement of the articles A. The mechanism includes a longitudinally extending bar 58 which is supported upon a vertically movable plunger 59 guided for vertical movement in guides 60 and 61 carried by a supporting bracket 62. The guides 60 and 61 are made in sections and bolted to the support 62 in an obvious manner. The bar 58 at its middle is enlarged at 58a to fit over the plunger 59 to which it is keyed and with which it has movement. Between the guides 60 and this head 58a is a coiled compression spring 63 which urges the plunger upward, and bearing against the lower face of the guide 60 is a coiled compression spring 64 which at its lower end bears against a collar 65 carried upon the plunger 59 as, for instance, by the pin 66. The spring 63 is heavier or has a greater tension than the spring 64 so that the plunger is normally urged upward beyond the position shown in Figure 4 which is its depressed position.

Mounted upon the extremities of the yoke or bar 58 are two arms, one of which is designated 67 and the other 68. These arms are angular in plan view as shown in Figure 3.

The arm 67 at its end has pivoted to it the angular contact finger 69. The upper end of this finger terminates in a wedge-shaped head 70 having a wear plate 71 applied thereto and at its inner end carrying the roller 72. A spring 73 forces the contact finger 69 to a vertical position against a stop 74, the spring 73 being connected at one end to the finger 69 and at its other end to the member 67. The other arm 68 likewise has a contact finger 75 constructed in the same manner as the finger 69 and having a wear plate 71 and a roller 72 and being urged to a vertical position by the spring 73 and against a stop 74. The finger 75 is extended beyond its pivotal point 75a as shown in Figure 4 to provide an arm 76 which at its lower end is pivoted to a link 77 in turn pivoted to an arm 47 of a valve of exactly the same character as that shown in Figures 7 and 8, the valve casing being provided with the inlet pipe 55 and with the outlet pipe or exhaust pipe 54 and the pipe 22 leading from the cylinder 20 leading into the valve casing 48 in the same manner as previously described so that in one position of the valve, the pipe 22 is connected to the exhaust pipe 54 and in another position of the valve, the pipe 22 is connected to the inlet pipe 55.

The operation of this form of my mechanism is as follows:—

Before the article reaches this station, the plunger 59 is in a raised position due to the action of the spring 63 and the fingers 69 and 75 are, of course, in a raised position, that is, raised above the level of the rollers 10. When the article reaches the head 70, it moves along over the inclined surface of wear plate 71, forcing this wear plate and the finger 69 downward, which forces the entire yoke or bar 58 downward against the action of the spring 63.

If the article is of a length greater than the distance between the lines X—X, that is, between the two contact fingers 69 and 75, the article will have moved over the finger 75 before the rear end of the article has passed the finger 69 and thus the beam 58 or yoke will still be held downward against the action of the spring 63 until the rear end of the article commences to pass off of the roller carried by finger 75. As it passes off the head of the finger 75, however, the head will gradually rise because of the inclined face 71 until the article has entirely passed off and thus the beam 58 with the plunger will gradually rise to its normal position without in any way affecting the valve arm 47, the pivotal connection between the link 77 and the arm 47 permitting this. If an article of less length than the distance between the rollers 72 of the fingers 69 and 75 comes along, it will first depress the finger 69 and thus depress the beam 68 and, of course, the finger 75 but when the article has reached the position where its forward end has not yet struck the finger of roller 71 and its end has passed off of the roller 72 of finger 69, the beam 58 will be immediately lifted, bringing the finger 75 in position in front of the advancing article. The further advancement of the article, therefore, will cause the finger 75 to swing toward the right in Figure 4, thus shifting the link 77 toward the left and swinging the arm 47 of the valve in a clockwise direction to bring the valve to a position where communication will be established between the inlet pipe 55 and the pipe 22, causing the inward movement of the piston 21 and the lifting of the lifting arms 13 which will act to lift the article off of the rollers and allow it to slide or roll downward on to the skidways 14 and thus into the rack 15.

As soon as this has happened the spring 73 of finger 75 will retract it, shifting the valve back to a position where the pipe 21 is connected to the exhaust pipe 54, whereupon the lifting arms will lower by gravity to their normal position and the piston 21 will be returned to the position shown in dotted lines in Figure 3. Thus it will be seen that any article longer than the distance between the fingers 69 and 75 will not operate the sorting mechanism at this station but will pass on whereas any article shorter than the distance between the fingers will operate the mechanism to lift the lifting arms 13 and lift the article from the rollers and slide it down into the appropriate bin or rack.

Spring 64 acts as a retarder or cushioning spring acting to prevent too quick an upward movement of the beam 58 and the dampening of any oscillation of this beam due to the spring 63.

In Figure 5 I have shown a modified form of the structure shown in Figure 4 operating on the same general principle but in which a solenoid is used as heretofore referred to in place of the fluid actuated piston 21 for the purpose of raising the lifting arms and in which a controlling switch is operated by the depression of the contact finger carrying beam. Such a construction is shown in Figure 5. Figure 5 is generally speaking the same as Figure 4. Therefore, the same reference numerals are used. The difference between the construction shown in Figure 4 and that shown in Figures 5 and 9 resides in the fact that a solenoid 78 is used in place of the cylinder 20 and the piston 21 for operating the lifting arms 13. This solenoid 78 is provided with a core 79 which at its outer end is connected by a link 80 to the arm 17 which operates the lifting arms 13.

When the solenoid is energized the core 79 shifts into the solenoid, causing the lifting of the arms and when the solenoid is deenergized, the arms 13 fall by gravity to the horizontal position beneath the path of movement of the article A as shown in Figure 9.

For the purpose of controlling the passage of current to the solenoid, I provide a controlling switch shown in detail in Figures 10, 11 and 12. This comprises an outer casing 81 lined with insulating material 82 and having opposed contact members 83 disposed at diametrically opposite points in the lining 82. These contact members have inserted therein the bolts 84 carrying the binding nuts 85. One of these contact members 83 is connected to the power line 86. The other contact member is connected by the conductor 87 to the solenoid coil, the solenoid coil in turn being connected to the power line 88.

Oscillatably mounted within the casing is a vertical shaft 89 carrying the tubular member 90 within which are disposed the two brushes 91 which are urged outward against the walls of the lining 82 by means of the spring 92. The shaft 89 is provided with the arm 93 which is connected by a link 94 to a lever 95 mounted upon the supporting bracket 96 which supports the guides 60 and 61 as heretofore described. This lever 95 is connected at its inner end by a link 97 to an annulus 98 surrounding the plunger 59 and against which the spring 65 bears. It will be understood that normally the beam 59 with its fingers 69 and 75 is raised by the spring 63 and that the switch arm 90 is in a position where its brushes are out of contact with the contacts 83 so that the solenoid is deenergized.

Assuming that an object longer than the distance between the contact fingers 69 and 75 arrives at this station, the forward end of the article A will bear against the inclined wear plate 71 of the head 70, thus forcing the beam 58 downward. This will shift the tubular arm 90 with its brushes still further away from the contacts 83 so that the solenoid remains deenergized. The article moves onward propelled by the rollers 10 and before the rear end of the article moves off of the finger 69, the forward end of the article has moved on to the finger 75 so that the beam 59 is still held forced downward by the weight of the article. As the rear end of the article passes off of the finger 75, this finger gradually rises due to the inclined upper face of the head 70 of this finger 75 and thus the beam 59 is allowed to gradually move upward, returning the switch to its initial position but not bringing the switch arm 90 to such position that its brushes will engage the contact members 83. If an article of less length than the distance between the rollers 72 of the fingers 69 and 75 comes along, the article will first depress the beam 59 by engaging with the finger 69 but with an article of this length, before the forward end of the article can ride on to the roller of finger 75, the rear end of the article has passed the roller 72 of finger 69 so that the beam 59 is free to move upward and immediately springs upward under the action of the spring 63. This upward movement because of the sudden release of both fingers 69 and 75 has a relatively great amplitude, causing the arm 93 to swing further than it ordinarily would and brings the switch arm 90 into such position that the circuit is closed through the solenoid 78 which immediately acts to draw inward on its core and rock the shaft 11 and swing the arm 13 upward, lifting the article off the rollers as shown in Figure 9 in dotted lines so that the article will run down the arms 13 on to the skidway 14 and then into the space 15. The reaction upon beam 59 of spring 63 causing the beam 59 to move downward slightly which breaks the connection with the solenoid, the solenoid then becomes deenergized and the arms 13 drop to their normal position under the action of gravity, withdrawing the core 79 from the solenoid coil 78.

It will be seen that the structure shown in Figure 5 is in most respects similar to the structure shown in Figure 4 except that the lifting mechanism is controlled by a solenoid instead of by a fluid pressure motor and the circuit through the solenoid is controlled by a switch instead of a fluid circuit through a fluid motor being controlled by a valve.

*Vertically movable beam, hydraulically controlled machine*

In Figures 13 and 14, I show still another embodiment of my invention in which the lifting arms are controlled by a fluid pressure motor in turn controlled by a controlling valve operated by a beam. Inasmuch as the lifting arms and the means for operating the lifting arms are the same as is shown in Figures 1 and 2, the same reference numerals have been used for these parts. The means for actuating the lifting arms comprises a longitudinally extending beam 99 which is pivoted at 100 upon a supporting ear 101 extending upward from a base 102, which base is mounted upon the supporting frame 103. This beam is unequally pivoted, or in other words, it has a short arm at the forward end of the beam and a long arm at the rear end of the beam, this long arm extending downward and rearward. The short arm of the beam at its ends is pivoted to a bolt or plunger 104 which passes through the base 102.

Surrounding the upper end of this plunger 104 above the base 102 is a coiled compression spring 105 and surrounding the lower portion of the plunger below the base 102 is a coiled compression spring 106 which at its lower end bears against the washer 107. The valve controlling mechanism is connected to the lower end of this plunger. Just beyond the pivot 100, the beam is provided with the laterally projecting arm 108, the extremity of this arm 108 being disposed beneath the path of movement of the article A. This extension 108 carries upon its end the head 109 which has an upwardly inclined upper surface protected by a wear plate 110. This shoe also carries upon it the roller 111 upon which the article is adapted to roll. At its rear end the beam 99 has an angular extension or arm 112 which extends beneath the path of movement of the article A and is then angularly bent to extend forward at 113. Pivoted to the extremity of this angular extension is the contact finger 114 which extends upward and is provided at its upper end with the head 115. The upper face of this head 115 is downwardly and rearwardly inclined and protected by the wear plate 116, the forward end of the shoe immediately above the head 115 carrying the roller 117. A spring 118 acts to hold this finger 114 in a vertical position against a stop or abutment 119 formed on the angular portion 113. It will be understood that the head 109 also constitutes in this case one of the selecting fingers and that the article adapted to be discharged at this station is one which is less in length than the distance between the lines X—X in Figure 13 or the distance between the rollers 111 and 117. A compression spring 120 is carried by the base 102 and bears upward against the under face of the beam 99 as shown in Figure 13 and with the spring 106 resists depression of this portion of the beam.

The lifting fingers 13 are mounted upon the shaft 11 supported by the supports 12 and this shaft is provided with the downwardly extending arm 17 as heretofore described, this arm being connected to the piston rod of the piston 21 operating within the cylinder 20, the cylinder having an inlet pipe 22 as heretofore described. Admission of fluid pressure to the cylinder 20 is governed by the valve, the casing of which is designated 48 and which is shown in detail in Figures 7 and 8 and which has been heretofore described. It is not believed necessary to restate the construction of this valve. The valve is provided with an arm 121 shown in dotted lines in Figure 13. The valve casing is provided with the inlet pipe 55 leading from a source of fluid under pressure and the outlet pipe 54 and when the valve is turned in one position, as for instance, in the position shown in Figure 13, the pipe 22 is connected to the outlet pipe 55 and when the valve is shifted to its other position, the pipe 22 is connected to the inlet pipe. The arm 121 has a sliding pivotal connection to a lever 122 pivoted at 123, there being a slot 124 in the lever for the pivotal connection to the arm 121. The lever 122 is connected by a link 25 to the lever 126 pivoted at 127 and having its short end connected by a link 128 to an annular member 129 carried on the lower end of the plunger 104 and held in place between the washer 107 and a nut 130. The operation of this structure is as follows:—

Normally the rear arm of the beam 99 is forced upward by the spring 120 and by spring 106 so that the wear plate 110 with the roller 111 and the roller 117 are disposed in the path of movement of the article A which is being carried along toward the right in Figure 13 by the power operated rollers 10.

As the forward end of the article A strikes the incline 110, it forces the forward end of the lever downward against the action of the spring 120 and 106. This brings the parts to the position shown in Figure 13 and opens communication between the cylinder 20 and the exhaust pipe 54 so that the weight of the lifting arms 11 causes these arms to drop and the piston 21 to move to the position shown in Figure 14. If the article A is longer than the distance between the lines X—X in Figure 13, the forward end of the article will move over the roller 117 and before the rear end of the article has left the roller 111 so that the beam will continue to be held down. As the rear end of the article passes the roller 117, it will allow the gradual upward movement of the head 115, finger 114 and beam under the action of the springs 106 and 120 and when the article has entirely passed the head 115, the forward end of the beam 99 will again be raised.

If now an article of less length than the distance between the rollers 111 and 117 comes along, its action will be first to ride up the inclined face 110 and depress the beam 99 but under these circumstances before the forward end of the article strikes the roller 117, the rear end of the article has passed the roller 111. As soon as this occurs, the beam will spring upward suddenly in the manner heretofore described for the other embodiments of my invention and the forward arm of the beam will move downward suddenly and with relatively great amplitude of movement which will act to shift the controlling valve arm 121 to such a position that the controlling valve will open communication between the inlet pipe 55 and the pipe 22.

This allows the passage of motive fluid into the motor or cylinder 20, causing the rearward movement of the piston and the elevation of the lifting arms, thus lifting the article from the rollers and discharging the article into the space 15 as heretofore described. The spring 105 will resist the immediate return of the parts to the position with the forward end of the beam raised and thus prevent the immediate cutting off of fluid therethrough from the cylinder 20.

In Figure 15, I have shown a construction which is very similar to that shown in Figures 13 and 14 and operating on the same principle except that in place of the fluid operated cylinder and piston used as a motor, I provide a solenoid such as shown in 9 with a controlling switch such as shown in Figures 10, 11 and 12. In other words, the structure shown in Figure 15 is a combination of the structure shown in Figures 8 to 12 and the structure shown in Figures 13 and 14. In Figure 15, the beam is designated 99 and is of the same form as shown in Figure 14 and at its forward end carries the upwardly extending finger 114 which is pivoted at 119 as previously described and carries the head 115 with the wear plate 116 and the roller 117. The beam is pivoted at 100 as previously described and the forward end of the beam carries upon it the plunger 104 surrounded by the springs 105 and 106, the forward end of the beam being urged upward by the spring 120 and the beam just forward of its pivot carrying upon it the head 109 with the roller 111 and the inclined face 110. So far all the parts are exactly as illustrated in Figures 13 and 14. The solenoid 78, however, is connected by the wire 87 to the switch, the casing of which is designated 81 and which is shown in detail in Figures 10 to 12, the switch in turn being connected by the wire 86 to switch 131 connected to the power line, the wire 88 leading from this switch to solenoid.

The arm 93 of the switch, however, in the construction shown in Figure 15 is connected by a rod or link 132 to the finger 114. Normally the solenoid 78 is disconnected from the source of energy through the switch and the beam 99 has its forward end forced upward by the springs 106 and 120 so that the inclined face 110 of contact member 109 is disposed in the path of movement of the article A. If an article having a length greater than the distance between the rollers 111 and 117 arrives at this station, this article being propelled, of course, by the power operated rollers 10, the forward end of the article striking against the inclined face 110 will force the rear end of the beam 99 downward until the parts arrive in the position shown in Figure 15. The article moves onward and before its rear end has left the roller 111, the forward end of the article has engaged the roller 117 and thus the beam 99 is held downward until the article has passed off the inclined face 116. As it passes off this inclined face, it permits the gradual lifting movement of the head 115, the finger 114 and the beam 99. Under these circumstances, the switch remains unaffected and thus the solenoid remains de-energized and the lifting arms unaffected. If an article shorter than the distance between the rollers 11 and 117 comes along before the forward end of the article has reached the roller 117, the rear end of the article has passed the roller 11. As a consequence, the rear end of the beam moves upward under the action of the springs 120 and 106 so that the upper end of the finger 114 is disposed in the path of movement of the article.

The forward movement of the article, therefore, causes the finger 114 to swing toward the right in Figure 10 against the action of the spring 118, pulling upon the link 132 and shifting the switch arm 93 to such position that the switch is shifted to a position connecting the contacts to the wires 86 and 87, thus closing the circuit through the solenoid. The solenoid then acts to retract its core 79, retracting the lever 17, rotating the shaft 11, raising the lifting arms 13, lifting the article upward from the rollers 10 and allowing the article to slide or roll downward on the lifting arms until it strikes the skids 14 and is discharged into the space 15. As soon as the article has been discharged, the parts will return to their normal position.

*Electrically controlled swinging contact, hydraulically operated machine*

In Figures 16 to 21, I have illustrated an electrically operated selector mechanism or sorting mechanism in which the same lifting arms are used operated by a fluid pressure motor cylinder but in which the passage of the fluid to the cylinder or from the cylinder is controlled electrically. The same reference numerals have been used for the lifting arms 13, the shaft 11, the arm 17, extending downward from the shaft and the fluid pressure motor 20 with its inlet pipe 22. Disposed at the entrance end of the sorting station is a supporting frame 133 and pivoted upon the upper end of this frame 133 is a contact finger 134. Disposed at a predetermined distance from the supporting frame 133 is a supporting frame 135 carrying a pivoted contact finger 136. Both of these fingers are provided with a roller 137 at the upper end.

These fingers operate in the nature of pendulums and swing by gravity to the position shown in dotted lines in Figure 16. Each pendulum or finger 134 and 136 carries upon it a contact brush 138. The cylinder 20 has therein a piston as shown in Figures 1, 2, 3 and 4, and also 14, is operated by fluid pressure and is connected by a pipe 22 to a controlling valve casing designated 139 shown in detail in Figure 17. This has a lower inlet port and pipe 140 and an upper outlet pipe 141. Disposed within the casing is a piston valve 142 which when it is raised in dotted line position in Figure 17 permits communication between the inlet pipe 140 and the pipe 22 leading to the cylinder 20 and when lowered permits communication between the cylinder 20 and the outlet or exhaust pipe 141. This valve is connected to a stem 143 in turn connected to a lever 144 pivoted at its outer end to the frame 133.

Disposed below this lever is a solenoid 145 having a core 146 which when raised by the energizing of the solenoid 145, lifts up on the lever 144 and raises the valve 142. Normally the valve 142 is in its lowered position and is urged thereto by gravity. This solenoid is connected in circuit with the secondary 147 of a transformer whose primary is designated 148, this transformer being connected through the switch 149 to the line wires 150. One side of the secondary coil 147 is connected by the conductor 151 to one bar 152 of a pair of conducting bars mounted upon the frame 133. The other bar 153 of these bars is connected by the conductor 154 to the solenoid. Therefore, when the brush 138 of pendulum lever 134 bears against these bars 152 and 153, a circuit will be closed through the solenoid. Normally, however, this circuit is open.

Disposed above the solenoid 145 and mounted upon the frame 133 is an outwardly extending solenoid 155 having a core 156 which extends through the frame 133 as shown in Figures 17 and 21 and constitutes a stop. This stop is normally urged rearward by a leaf spring 157 as shown in Figure 21. This solenoid 155 is electrically connected on one side to the secondary 147 and on the other side by a conductor 158 to a conductor bar 159 disposed in space relation to a second conductor bar 160 which is connected by a conductor 161 to the conductor 151 and thus to the secondary 147. When the brush 138 of the pendulum lever 136 is swung to the full line position in Figure 16, the circuit across these conductor bars 159 and 160 will be closed and the circuit through the solenoid 155 will be closed. This will project the extremity of the core 156 into the path of movement of the lower end of the pendulum lever or finger 134. Mounted upon a bracket 162 which is attached to the frame 133 is a compression spring 163 which is disposed in the path of movement of the pendulum lever 134 or finger.

The operation of this mechanism is as follows:—

Normally the pendulum levers 134 and 136 are disposed in a vertical position as shown in dotted lines in Figure 16 and held in this position by gravity. Under these circumstances the circuits are opened, the valve 142 is lowered, the piston of cylinder 20 is disposed at the forward end of the cylinder and the lifting arms 13 are lowered. When an article having a length greater than the distance X—X in Figure 16 approaches this station, propelled by the rollers 10, the forward end of the article will strike the upper end of the pendulum lever 134 and turn it from the full line position to the dotted line position in Figure 16, holding it in this position.

The forward end of this article will then strike the upper end of the pendulum lever 136 before the rear end of the article has left the lever 134 and this lever 136 will turn to the full line position in Figure 16. This will close the circuit through the brush on lever 136, the bars 159 and 160 through the secondary 147 and through the solenoid 145, energizing the solenoid and projecting the core 146 into the path of movement of the pendulum lever 134, but, of course, the circuit through the solenoid 145 will not be closed. The rear end of the article A passes off of the roller 137 on to lever 134 and this lever swings back to its initial position but is prevented from going further than this vertical or initial position by the projected stop constituted by the core 156 of solenoid 145. When the rear end of the article A passes off of the pendulum lever 136, the lever will then swing to its dotted line position, breaking the circuit through the solenoid 155, whereupon the spring 157 returns the core of the solenoid to its initial position.

When an article having a length less than the distance between the points X—X in Figure 16 arrives at this station, the forward end of the article first strikes the upper end of the pendulum lever or finger 134 and turns it to the full line position in Figure 16, compressing the spring 163. Before the forward end of the article reaches the upper end of pendulum lever or finger 136, the rear end of the article passes off the lever 134, which, because of the pressure of spring 162 swings violently downward and past its vertical position (which is permitted by the fact that the core 156 is not projected into its path of motion) and swings over until its brush comes in contact with the switch bars 152 and 153.

This closes a circuit through the secondary 147 of the transformer and through the solenoid 145, the solenoid retracts its core 146, lifting the valve 142 to its raised position and admitting the inlet or motive fluid from pipe 140 to 142 and thence to the cylinder, forcing the piston of the cylinder inward, lifting the arms 13 to lift the article off the track and allow it to roll or slide down the skidways 14 into the space 15 as previously described. As soon as the lever 134 has swung back to its initial position which it does relatively slowly because of the contact of the brush with the bars 152 and 153, circuit through the solenoid 145 will be broken and the valve 142 will descend slowly through its own weight and that of the arm 144 until it has cut off the inlet of fluid pressure through pipe 140 and then the weight of the lifting arms 13 urges the piston of cylinder 20 outward, the fluid in turn in front of the piston escaping through pipe 22 and exhaust pipe 141. The parts are again in normal position ready for the arrival of the next article.

*Vertically movable contacts, electrically controlled machine*

The form of the invention as shown in Figure 22 includes two vertically movable fingers or contact members which are vertically depressed by the passage of an article over them and which act to complete or break the circuit through certain operating solenoids controlling the main solenoid which is used for the purpose of operating the lifting arms. In this figure 164 designates a vertically movable stem or shank of the first contact finger, 165 designating the head thereof which has an inclined face provided with a wear plate 166 and with the roller 167.

Disposed at a predetermined distance from the head 165 is the head 168 of a second finger, the shank of which is designated 169. It will be noted that the inclined faces of both of these heads 165 and 168 are inclined in the same direction. Between these contact fingers or elements is the shaft 11 carrying the lifting arms 13 mounted in the supports 12 and coacting with the downwardly inclined skidways or runways 14, all as previously described. To the shaft 11 is attached the long downwardly extending arm 17 which coacts with a solenoid 78 as previously described for the structure shown in Figure 15, for instance. All of these parts are as previously described and, therefore, the same reference numerals have been used. The article A, of course, is carried upon a track shown as including the power operated rollers 10 previously described.

The shank 164 of the first contact finger of the station extends downward through and constitutes the core of a solenoid 170. This core passes through a coiled compression spring 171 resting upon the upper end of a supporting frame 172. Carried upon the lower end of the core of the solenoid 170 is a bridge or conducting bar 173 carrying upon it at its opposite ends the two spring contacts 174. Coacting with this conducting bar is a transversely extending insulated support 175 carrying upon it the two contacts 176 and 177. The contact 177 is connected by a conductor 178 to the secondary 179 of a transformer, the primary of which is designated 180, the primary being connected through the switch 181 with the power lines 182. The contact 176 is connected to one end of the solenoid 170, the other end of the coil of the solenoid being connected to a conductor 183 which, as will be hereafter described, is connected to the switch controlled by the second finger.

Leading from contact 176 is a conductor 184 which connects to one end of a solenoid coil 185, the other end of which is connected to the line 183. It will thus be seen that the two solenoids 170 and 185 are connected in parallel. When, therefore, the contacts 174 and 175 engage the contacts 176 and 177, current will pass from the secondary 179 to contact 176 and thence the current will pass simultaneously through the coil 170 and through the coil 185 and then back through line 183 and the switches to be hereafter described to the secondary 179. The core 164 of solenoid 170 is extended below the bar 173 and extended through a bracket 186 and below this bracket is surrounded by the compression spring 187 which bears at its upper end against a bracket and at its lower end against a collar 188 carried by the core. This spring is of less strength than the spring 171.

The solenoid 78 is connected by conductors 189 and 190 through switch 191 to the power lines 192 and disposed in the conductor 189 is a knife switch, the plate of which is designated 193. This preferably operates within an oil bath 194. The free end of this switch is connected to a link 195 in turn at its upper end connected to a lever 196 pivoted at 197 and to the short end of this lever is connected the core 198 of the solenoid 185. A spring 199 surrounding the link 195 urges this end of the lever 196 downward and urges the switch blade 193 to an open position. When the solenoid 185 is energized, however, the switch blade closes the circuit through the lines 189 and 190, thus energizing the solenoid 78.

The stem 169 of the second contact finger extends downward through a bracket 200 mounted upon a support 201 and a coiled spring 202 engages this stem.

A spring 203 of greater strength than the spring 202 engages against the head 168 and the upper end of the support 201 and urges this contact finger, the head of which is designated 168 upward. Mounted upon the support 201 is the bar 204 of insulating material carrying the two contacts 205 and 206 and mounted upon the stem 169 for movement therewith is a conductive bar or switch 207 having spring contacts 208 thereon which when this stem is raised by spring 169 to its full extent, engage with the contacts 205 and 206.

Normally and when the head 168 is not depressed by an article resting thereon, the stem and the switch bar 207 are raised from the position shown in Figure 22 and the contacts 208 are in engagement with the contacts 204 and 206 so that a circuit is completed at this point through the conductor 183 to the secondary 179.

In order to provide for breaking the circuit through conductor 183 and, therefore, through the secondary 179, I provide a normally closed switch which is opened by the discharge of an article down the raised lifter arms 13. This switch comprises a triangular head 209 carrying the roller 210 and having the stem 211. This stem extends through a coiled compression spring 212 which rests upon the upper end of the support 213, disposed to one side of the path of travel of the article and between two of the lifting arms 13. The head 209 is disposed with its pointed end nearest to the path of movement of the article and with the roller 210 furthest from the path of movement of the article and the head 209 is so disposed as to be struck by any article sliding, rolling or otherwise moving down the lifted lifting arms 13.

Surrounding the lower end of this stem is a coiled compression spring 214 which bears against a bracket 215 projecting from the support 213 and bears at its lower end against a washer, shoulder or like element 216 carried by the stem. This spring 214 is of less strength than the spring 212. Carried by the stem 211 but insulated therefrom is a switch bar 217 carrying at its ends the spring contacts 218. Carried by the support 213 is a bar 219 of insulating material carrying the oppositely disposed contacts 220 and 221. These contacts are connected in the length of the conductor 183 and from the contact 221 the conductor 183 extends to the secondary 179 of the transformer coil. With the mechanism arranged as shown in Figures 22 and 23, the operation will be as follows:—

Normally the first contact finger will be raised by the spring 171 so that the inclined face of the head 165 is disposed in the path of movement of the article A but the contacts 174 are not under these circumstances in engagement with the contacts 176 and 177. As a consequence, the circuit from the secondary 179 through the solenoids 170 and 185 is broken. The remainder of the circuit, however, is closed by the switch bar 207 and the switch bar 217.

When an article having a length greater than the distance between the lines X—X arrives at this station, the forward end of the article depresses the head 165 and the parts are in the position shown in Figure 22, the circuit through the solenoids remaining open. The forward end of the article moves onward and depresses the head 168 of the second contact finger, breaking the circuit between contacts 208 and contacts 205 and 206 so that when the rear end of the article has left the head 165 and passes off the roller 167, while the circuit is completed at contacts 176 and 177, the circuit is broken at contacts 205 and 206 so that the circuit through the solenoids 170 and 185 is still open. As soon as the article has moved off the head 165, this head springs upward under the action of spring 171 and momentarily the contacts 174 engage the contacts 176 and 177 but the spring 187 immediately acts to draw down on the stem 164 so that the contacts 174 are again immediately disengaged from the contacts 176 and 177. When the rear end of the article passes off of the head of the article 178 of the second contact finger, the spring 203 shifts the stem upward and engages the contacts 208 with the contacts 205 and 206.

If an article less than the length of the distance between the lines X—X comes to this station, the action is as follows:—

The forward end of the article depresses the head 165 to the position shown in Figure 22 but before the forward end of the article has reached the head 168, the rear end of the article has passed off of the roller 167, and the stem 164 swings upward violently under the action of the spring 171 caused by a sudden release of the article and the switch bar 173 closes connection between the contacts 176 and 177. This immediately closes a circuit through the solenoid 170 which thus acts through its core or stem 164 and the contact plate 164a to hold the core of the solenoid or stem 164 upward and not permit it to drop downward again. This, therefore, closes a circuit from the secondary 179 through the solenoid 170 and at the same time through the solenoid 185, causing the closing of the switch blade 193, and completing the circuit through the solenoid 78, causing the upward movement of the lifting arms 13 and lifting of the article from the rollers 10 and the discharge of the article downward on to the downwardly inclined arms 13.

The parts remain in this position with the circuit closed through the solenoids 170 and 185 until the article as it moves down the arms strikes the head 209. This acts to depress the stem 210 and break the circuit to the secondary through the switch bar 217. As soon as this occurs, the circuit is broken through the solenoid 170 which permits the retraction of the switch bar 173 by the action of spring 187 and at the same time the circuit through the solenoid 185 is broken and the switch 193 is opened by the spring 199, thus breaking the circuit through the solenoid 78. As soon as the article has been discharged from the lifting arms 13, the lifting arms return to their inoperative position by gravity, the article rolling down the skidways 14 and being discharged into the bin as previously described.

*General summary*

It will be seen that in all forms of my invention, I have provided two selecting or contact fingers engaged successively by an article moving over these contact fingers and that in all forms of my invention, if the article is of such length as to actuate both contact fingers or selectors, then the lifting devices comprising the lifting arms and their actuating means are not actuated and the article moves on to the next following station but that if the article is of a predetermined length less than the distance between the contact fingers or selectors, then when the article moves off of the first contact finger without having moved on to the second contact finger, one or both of these contact fingers are shifted and by means of valves or switches as the case may be cause the actuation of the lifting arms and the discharge of the article laterally of the track into the bin or other collecting receptacle.

It will be seen that in all forms of my invention, I have provided lifting arms disposed beneath the path of movement of the article and a motor, either a fluid operated motor or an electrically operated motor which automatically actuates these arms when an article of the proper length arrives at the station. It is to be understood that while I have shown a fluid operated motor in certain of the figures which comprises a piston and cylinder, that other forms of fluid operated motor might be used that come within the terms of the appended claims and that other forms of electrically operated motor might be used other than a solenoid if within the terms of the appended claims.

It will likewise be obvious that many changes might be made in the details of the construction and arrangement of the parts without departing from the spirit of the invention and that I do not wish to be limited to the use of power operated rollers 10 as conveyors as the conveying means forms no particular part of my invention and other means for conveying the articles to the several stations might be used such as would permit the operation of the lifting arms.

I claim:—

1. A sorting machine including a conveyor along which the elements to be sorted pass, means adapted when actuated to lift the elements from the conveyor and discharge said elements laterally, and length determining members spaced from each other and disposed in the path of travel of the elements to be sorted for successive engagement by said elements, the engagement of both of said members at one time by an element to be sorted preventing the actuation of said lifting and discharging means, the disengagement of an element from one of the members as it passes along the conveyor before the said element engaging the other member acting to operate the lifting and discharging means.

2. A sorting machine including a conveyor along which the elements to be sorted pass, means adapted when actuated to lift the elements from the conveyor and discharge said elements laterally, gauging members spaced from each other a predetermined distance and disposed in the path of travel of the elements to be sorted for successive engagement thereby, and means actuated by the passage of the rear end of an element beyond one of said gauging members before the forward end of the element reaches the other gauging member for actuating said lifting and discharging means.

3. A sorting machine including a conveyor along which the elements to be sorted pass, means adapted when actuated to lift the elements from the conveyor and discharge the elements laterally, a pair of gauging members spaced a predetermined distance from each other and yieldingly supported in the path of movement of said elements over said conveyor and adapted to be successively engaged by said elements, said members being shifted by engagement with said elements, and means actuated by the release of the first member with said element before the forward end of the element reaches the other gauging member for actuating said lifting and discharging means.

4. A sorting machine including a conveyor along which the elements to be sorted pass, means adapted when actuated to lift the elements from the conveyor and discharge the elements laterally, a pair of controlling members acting as gauges and spaced a predetermined distance from each other and disposed in the path of movement of the elements passing over said conveyor and adapted to successively engage therewith and shifted out of normal position, means actuated by a release of the first member of the pair from engagement with the element to actuate the raising and discharging means, and means actuated by the second member of the pair when shifted by engagement with said element, acting to prevent the actuation of said raising and discharging means.

5. A sorting machine including a conveyor along which the elements to be sorted pass, a shaft extending parallel to the path of movement of the elements, arms carried by the shaft and normally disposed beneath the path of movement of the elements, a motor for oscillating said shaft in a direction to lift said arms to an upwardly and laterally inclined position to thereby lift an element from the conveyor and discharge it laterally, and means controlled by the length of the elements for actuating said motor when the elements is of a predetermined length.

6. A sorting machine including a conveyor along which the articles to be sorted pass, a shaft extending parallel to the conveyor and having outwardly extending arms disposed beneath the path of movement of the article, said arms when the shaft is rocked, lifting the article from the conveyor and discharging it laterally, means for oscillating said shaft including an arm extending from the shaft, a motor operating when actuated to swing said arm to raise the lifting arms and discharge the article, and controlling means for said motor including two members disposed in the path of travel of the articles and movable by engagement therewith, said members being spaced a predetermined distance apart, and controlling means for the motor actuated by the release of the first of said members from its engagement with the article and before the engagement of the article with the other member acting to energize the motor, the engagement and movement of the second member by said article before the first named member is released acting to prevent the energizing of the motor.

7. A sorting machine including a conveyor along which the articles to be sorted pass, a shaft extending parallel to the conveyor and having arms normally disposed transversely of but beneath the path of movement of the articles on the conveyor, a motor for the shaft to oscillate it including a cylinder having a piston, means causing the passage of motive fluid into one end of the cylinder to thereby cause the oscillation of the shaft and the lifting of said arms, a controlling valve for said cylinder, and means for controlling said valve including two members normally disposed in spaced relation to each other, and projecting into the path of movement of the articles on the conveyor and adapted to be successively engaged by an article having a length greater than the distance between said members, said members being adapted to be shifted by engagement with the article, the first member to be engaged by the article when released by the passage of the article beyond the member acting to shift the controlling valve to permit the passage of fluid into the cylinder to actuate the piston thereof, a second member when engaged by the article being shifted to prevent the shifting of said valve to its piston operating position.

8. A sorting machine including a conveyor along which the articles to be sorted pass, a shaft extending parallel with the conveyor and having arms normally disposed transversely of but beneath the path of movement of the articles on the conveyor, a motor for the shaft to oscillate it including a solenoid having a core, the core being operatively connected to the shaft including a circuit for the coil of the solenoid, a controlling switch for said circuit, and means for shifting said switch into a position to energize the solenoid including two members normally disposed in spaced relation to each other and projecting into the path of movement of the articles on the conveyor and adapted to be successively engaged and shifted by an article having a length greater than the distance between said members, the first member to be engaged by the article when released by the passage of the article beyond the member acting to shift the controlling switch to permit the passage of current through the coil of the solenoid, the successively engaged member when engaged by said article being shifted to prevent the shifting of said switch to its energizing position.

9. A sorting machine including a conveyor along which the articles to be sorted pass, means adapted when operated to lift the article from the conveyor and discharge said article laterally, a motor for said lifting means, two spaced gauging members successively engaged by the articles passing along the conveyor and urged into normal position in the path of movement of said articles and shifted into a sub-normal position by engagement with an article and when suddenly released from the sub-normal position momentarily urged into a super-normal position and then returning to a normal position, and motor controlling means shifted to a motor energizing position by the shifting of the first engaged member to super-normal position, the successively engaged member if engaged by the article and shifted to a sub-normal position preventing the shifting of the first engaged member to its super-normal position.

10. A sorting machine including a conveyor along which the articles to be sorted pass, means adapted when operated to lift the article from the conveyor and discharge said article laterally, a motor for said lifting means, two spaced gauging members pivotally mounted for swinging movement in a vertical plane and successively engaged by the articles and urged into normal position with their upper ends in the path of movement of the articles, said gauging members being shiftable in one direction into a sub-normal position by engagement with an article moving over the conveyor and when suddenly released swinging through a normal position into a super-normal position and then returning to normal position, motor controlled means shifted to a motor energizing position by the shifting of the first engaged member to said super-normal position, and means actuated by the movement of the second engaged member when moved into a sub-normal position by an article preventing the shifting of the first engaged member to its super-normal position.

11. A sorting machine including a conveyor along which the articles to be sorted pass, means adapted when operated to lift the article from the conveyor and discharge said article laterally, a motor for said lifting means, two spaced pivotally supporting gauging members swinging in a vertical plane and having their upper ends normally disposed in the path of movement of the articles on said conveyor and shifted into a sub-normal position by the engagement of an article moving in one direction on the conveyor, said members when suddenly released from engagement with the article momentarily swinging through a normal vertical position into a super-normal position and then returning under the action of gravity to normal position, motor controlling means operatively connected to the first engaged member and shifted by a swinging movement of the latter to its super-normal position into a position to energize the motor, and means operatively associated with the successively engaged member and acting to impede the movement of the first engaged member to its super-normal position when the successively engaged member is shifted to a sub-normal position.

12. A sorting machine including a conveyor along which the articles to be sorted pass, means adapted when operated to lift the article from the conveyor and discharge said article laterally, a motor for said lifting means, two spaced pivotally supporting gauging members swinging in a vertical plane and having their upper ends normally disposed in the path of movement of the articles on said conveyor and shifted into a sub-normal position by the engagement of an article moving in one direction on the conveyor, said members when suddenly released from engagement with the article momentarily swinging through a normal vertical position into a super-normal position and then returning under the action of gravity to normal position, motor controlling means operatively connected to the first engaged member and shifted by a swinging movement of the latter to its super-normal position into a position to energize the motor, and means operatively associated with the successively engaged member and acting to impede the movement of the first engaged member to its super-normal position when the successively engaged member is shifted to a sub-normal position and including a damping cylinder having a piston operatively connected to the first actuated member, a duct connecting the opposite ends of the cylinder and normally allowing free passage of liquid from opposite sides of the piston through the said duct, a by-pass smaller than the duct, and means controlled by the second actuated member causing the fluid in the cylinder to pass through this by-pass when the second actuated member has been shifted to a sub-normal position by engagement with an article.

13. A sorting machine including a conveyor along which the articles to be sorted pass, means adapted when actuated to lift the articles from the conveyor and discharge the articles, a motor operatively engaged with the lifting and discharging means, and means for energizing said motor including two swingingly mounted gauging members disposed in the path of movement of the articles and adapted to be successively engaged thereby, and swung in one direction by contact therewith, the release of the first engaged member acting to energize said motor, the simultaneous engagement of the other gauging member by the article acting to prevent the release of the first engaged member and the energizing of said motor.

14. A sorting machine including a conveyor along which the articles to be sorted pass, means adapted when actuated to lift the articles from the conveyor and discharge the articles, a motor operatively engaged with the lifting and discharging means, and means for energizing said motor when an article of a predetermined length comes to the discharge point including two gauging members mounted for vertical movement and urged into the path of movement of the articles and adapted to be successively engaged thereby and shifted downward by contact therewith to a sub-normal position, the release of the first engaged gauging member by the passage of the rear end of the article beyond it, causing the first engaged gauging member to move to a super-normal position under the action of the urging means, and means acting to thereby energize said motor, and means actuated by the depression of the second engaged member acting to prevent the energizing of said motor.

15. A sorting machine including a conveyor along which the articles to be sorted pass, means adapted when actuated to lift the articles from the conveyor and discharge the articles, a motor operatively engaged with the lifting and discharging means, means for controlling said motor including two gauging members resiliently urged into a normal position into the path of movement of the articles and adapted to be successively engaged thereby, the engagement of the articles with said members acting to depress the latter against the action of the resilient means to a subnormal position, and means actuated by the disengagement of an article from both of the gauging means after an article has engaged the first gauging means and passed beyond it acting to energize said motor to operate the lifting and discharging means.

16. A sorting machine including a conveyor along which the articles to be sorted pass, means adapted when actuated to lift the articles from the conveyor and discharge the articles, an electrically actuated motor operatively engaged with the lifting and discharging means, means for controlling said motor including two vertically movable gauging members disposed in spaced relation along the path of travel of the members, springs urging said gauging members upward to a normal position, the engagement of the article with either of said gauging members moving it to a sub-normal position against the action of the spring, a switch operatively connected to the first engaged gauging member and adapted to close the circuit through the motor when the first-named gauging member rebounds under the action of the spring to a super-normal position when the gauging member is released by the article, a switch operatively connected to the second engaged gauging member and preventing the closing of said circuit so long as the said second named gauging member is depressed.

17. A sorting machine including a conveyor along which the articles to be sorted pass, means adapted when actuated to lift the articles from the conveyor and discharge the articles, an electrically actuated motor operatively engaged with the lifting and discharging means, means for controlling said motor including two vertically movable gauging members disposed in spaced relation along the path of travel of the members, springs urging said gauging members upward to a normal position, the engagement of the article with either of said gauging members moving it to a sub-normal position against the action of the spring, a switch operatively connected to the first engaged gauging member and adapted to close the circuit through the motor when the first named gauging member rebounds under the action of the spring to a super-normal position when the gauging member is released by the article, a switch operatively connected to the second engaged gauging member and preventing the closing of said circuit so long as the said second-named gauging member is depressed, means for holding the circuit to the motor closed after the motor circuit has been closed by the upward movement of the first-engaged gauging member to its super-normal position, a member disposed in the path of movement of the articles as they are discharged, said member being depressed by said articles, and a switch operatively connected to the member and shifted thereby to break the motor circuit when the article is discharged.

18. A sorting machine including a conveyor along which the articles to be sorted pass, means adapted when actuated to lift the articles from the conveyor and discharge said articles, a fluid operated motor having a piston operatively connected to the lifting and discharging means to actuate it, and means for controlling the passage of fluid to said motor including two swingingly mounted gauging levers having their upper ends normally urged by gravity into the path of movement of the articles on the conveyor, a slide disposed in advance of the lever which is engaged by the article, a valve controlling the flow of fluid to or from the cylinder and operatively connected to said slide, said slide being shifted to operate said valve when the lever swings from a position to which it has been forced by the article past its normal position in the opposite direction when the rear end of the article has released the lever, a cylinder having therein a piston operatively connected to said lever to move therewith, the opposite ends of the cylinder being connected by a pipe of a diameter to permit free movement of the piston in said last named cylinder, a relatively small by-pass pipe operatively connected to opposite ends of the last named cylinder, and a valve in one position preventing the passage of fluid through the first named pipe and causing the passage of fluid through the by-pass pipe, the valve being operatively connected to the second engaged gauging member and being shifted to its operative position when the second named gauging member is in a vertical or normal position but being shifted out of operative position when the second named gauging member is swung by engagement with an article.

19. A sorting machine including a conveyor along which the articles to be sorted pass, means disposed beneath the path of movement of the articles and adapted when actuated to lift the articles from the conveyor and discharge them, a solenoid having a core engaged with said lifting means, a switch for controlling the passage of current to the solenoid, and means to actuate the switch when an article of a predetermined length arrives above the discharge means comprising a lever having a long arm, a gauging member mounted upon the long arm closely adjacent the fulcrum thereof, a second named gauging member, a support pivotally connected to the extremity of the long arm and to said gauging member, a link connecting said pivoted support to the switch, and a spring urging the long arm of the lever upward whereby when the lever is shifted upward under the action of the spring by the passage of an article beyond the first named gauging member and before the article has engaged the second named gauging member, the second named gauging member will be disposed in the path of the article and the engagement of the article with the last named gauging member will shift the switch.

20. A sorting machine including a conveyor along which the articles to be sorted pass, means normally disposed beneath the path of movement of the articles and adapted when actuated to lift the articles and discharge them, a motor, a controller therefor, and means for operating the controller when an article of predetermined length is passing over the lifting means including a vertically movable element carrying two gauging members having a distance between them greater than that of the article to be sorted, one of said gauging members being pivoted to said element for swinging movement in a vertical plane and being operatively connected to the controller, and a spring urging said element upward whereby after the element has been initially depressed by the article and rises under the action of the spring upon the passage of the rear end of the article beyond the first gauging member, the pivoted gauging member will be disposed in the path of movement of the article and thus shifted to actuate the lifting means.

21. A sorting mechanism including a conveyor along which the articles to be sorted pass, means normally disposed below the path of movement of the articles operating when energized to lift the articles from the conveyor and discharge them, a motor operatively connected to said lifting means, and means for energizing the motor when an article having less than a predetermined length arrives above the lifting means including two vertically movable gauging elements in longitudinally spaced relation, means urging said gauging elements upward to carry them into the path of movement of the articles, means for operating said motor including two switches, one associated with each of the gauging means, a depressible member disposed in the path of the article when it is discharged, a switch connected thereto, the motor being in a circuit with a source of current and said switches, the circuit being normally closed by the last named switch and by a switch associated with the member by the second engaging member, the switch associated with the first engaged gauging member being normally open but closed when the gauging member under the influence of its spring moves upward beyond its normal position, and means for maintaining said circuit closed until the switch associated with the lifting member is actuated.

22. A sorting mechanism including a conveyor along which the articles to be sorted pass, means normally disposed below the path of movement of the articles and when actuated, lifting the articles from the conveyor and discharging them, a solenoid having a core operatively connected to the lifting means to actuate it when the solenoid is energized, a pair of gauging members disposed in longitudinally spaced relation, springs normally urging said gauging members upward into the path of movement of the articles, a switch associated with the first engaged gauging member and closed when this gauging member rises above its normal position by a rebound of the spring when an article has released the gauging member, a second switch associated with the second engaged gauging member and closed when the gauging member is in its raised position but opened upon a depression of the gauging member below its normal position, an article depressible element disposed in the path of travel of the article when it is lifted and discharged from the conveyor, a switch associated with this depressible element, the switch being normally closed but being opened upon such engagement, said switches being disposed in circuit with the solenoid whereby when both of the gauging elements are raised by the passage of an article off the first-named gauging element, the circuit will be closed, and means for holding the circuit through the first named switch closed, said means being releasable by the actuation of said depressible element.

23. In a sorting machine of the character described, a conveyor along which the articles to be sorted travel, lifting and discharging means disposed below the path of travel of the articles, means for operating the lifting and discharging means when an article of a predetermined length arrives above the lifting means including gauging fingers normally disposed in the path of movement of the article, said gauging fingers having portions providing upwardly inclined faces directed toward the oncoming articles to cause the article to gradually shift said gauging members downward upon contact therewith, the second engaged gauging member having a downwardly and forwardly inclined upper edge face to permit the gradual rising of the second-named gauging member as the article passes off therefrom, the first named advanced gauging member having a downwardly extending face directed away from the direction in which the article is coming to permit the first named gauging member to swing up suddenly after the passage of the rear end of the article.

MICHAEL D. WALLACE.